United States Patent [19]

Galles et al.

[11] Patent Number: 4,700,864
[45] Date of Patent: Oct. 20, 1987

[54] SYNTHETIC MATERIAL VEHICLE FUEL TANK

[75] Inventors: Henri Galles, Aulnay sur Mauldre; Bernard Elias, Elancourt Maurepas, both of France

[73] Assignee: Regie Nationale des Usines Renault, Bolougne-Billancourt, France

[21] Appl. No.: 873,688

[22] Filed: Jun. 12, 1986

[30] Foreign Application Priority Data

Jun. 14, 1985 [FR] France ................................ 85 09044

[51] Int. Cl.⁴ .............................................. B65D 25/00
[52] U.S. Cl. ................................ 220/86 R; 220/85 R; 220/85 US; 220/85 UR
[58] Field of Search .............. 220/86 R, 85 R, 85 US, 220/85 UR

[56] References Cited

U.S. PATENT DOCUMENTS

| 3,330,439 | 7/1967 | Moorman | 220/86 R |
| 3,617,034 | 11/1971 | Skinner | 220/85 US |
| 3,653,537 | 4/1972 | Shiobara | 220/85 UR |
| 3,754,569 | 8/1973 | Fallofico | 220/86 R |
| 3,774,803 | 11/1973 | Bombardier | 220/85 R |
| 3,800,978 | 4/1974 | Sigwald | 220/85 R |
| 4,572,394 | 2/1986 | Tanahashi | 220/85 US |
| 4,657,156 | 4/1987 | Uranish | 220/85 US |

Primary Examiner—George E. Lowrance
Attorney, Agent, or Firm—Oblon, Fisher, Spivak, McClelland & Maier

[57] ABSTRACT

Fuel tank of synthetic material for motor vehicles has an expansion and venting system and consists of a main enclosure extended upward by an expansion chamber in which is housed filling pipe at the upper part of which is tapped a gas evacuation line including an expansion chamber and a siphon. A line further joins the upper part of an inlet pipe to another expansion chamber, forming a circuit with a hydraulic check valve.

7 Claims, 6 Drawing Figures

SYNTHETIC MATERIAL VEHICLE FUEL TANK

BACKGROUND OF THE INVENTION

1. Field of the Invention

This invention relates to a fuel tank of synthetic material for motor vehicles and more particularly to its expansion and venting system. It also relates to means to facilitate the automatic positioning of the above assembly, to simplify it and to limit its costs. It also relates to means to give the tank and its ancillary systems a level of reliability according to safety standards in force.

2. Description of the Related Art

The fuel tanks generally now known have within their enclosure an expansion volume that must remain unoccupied by liquid to compensate for fuel and gas expansion in case of heating.

There follows from the above the provision of several gas evacuation pipes coming from the upper part of the tank. These pipes are fastened to the tank in a manner which avoids siphoning during travel. However, this constitutes an assembly constraint, because it requires the piercing of certain obstacles, such as the cross members of the carrying structure, for the passage of said pipes, in order to maintain their continuity. The downward contouring of the pipes past these obstacles could produce the formation of the siphoning that must be avoided.

Another weakness of prior systems resides in the means used to reserve the expansion of volume during filling of the tank and its venting after closing of the cap. These functions are conventionally performed by mechanical check valves that lack reliability and whose cost, including mounting and checking of their various parts, is relatively high.

SUMMARY OF THE INVENTION

The structure of the tank according to the present invention mitigates this drawback. It is molded in one piece with its various lines, and can be mounted as a unit from beneath the vehicle in a single operation, without piercing any elements of the body, and without requiring the consecutive passage of pipes through openings made during an additional operation.

This invention also mitigates the drawbacks related to the reservation of the expansion volume by use of a hydraulic check valve of special structure.

According to the present invention, a fuel tank is formed of synthetic material and includes a main enclosure and a first expansion chamber communicating with the main enclosure. A fuel filler pipe is fitted to the first expansion chamber and a gas evacuation line is connected between an upper portion of the main enclosure and the fuel filler pipe, the gas evacuation chamber having an enlarged portion forming a second expansion chamber and a downwardly bent portion between the main enclosure and the second expansion chamber for forming a first siphon. A first cylindrical module is connected to the upper portion of the main enclosure and extends thereinto, the gas evacuation line communicating with the interior of the module. A fuel feed line and a fuel return line also communicate with the interior of the module.

A conduit connects an upper part of the fuel filler pipe with an upper part of the first expansion chamber. The conduit includes means for preventing the flow of fuel in one direction from the first expansion chamber to the fuel filler pipe. This means for preventing includes a housing, a portion of the conduit defining a first line extending from the fuel filler pipe and into the housing, another portion of the conduit defining a second line extending from the first expansion chamber into the housing, as well as float means in the housing and means for constraining the float means to abut and seal the first line in response to a fluid level in the housing reaching the first line. The float means are constituted by a spherical float and the means for constraining are formed as a first downwardly facing flared end of the first line and a second upwardly facing flared end of the second line below the first flared end, in which the float is positioned between the flared ends.

A portion of the second line is downwardly bent to form a second siphon.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENT

Figure 1:
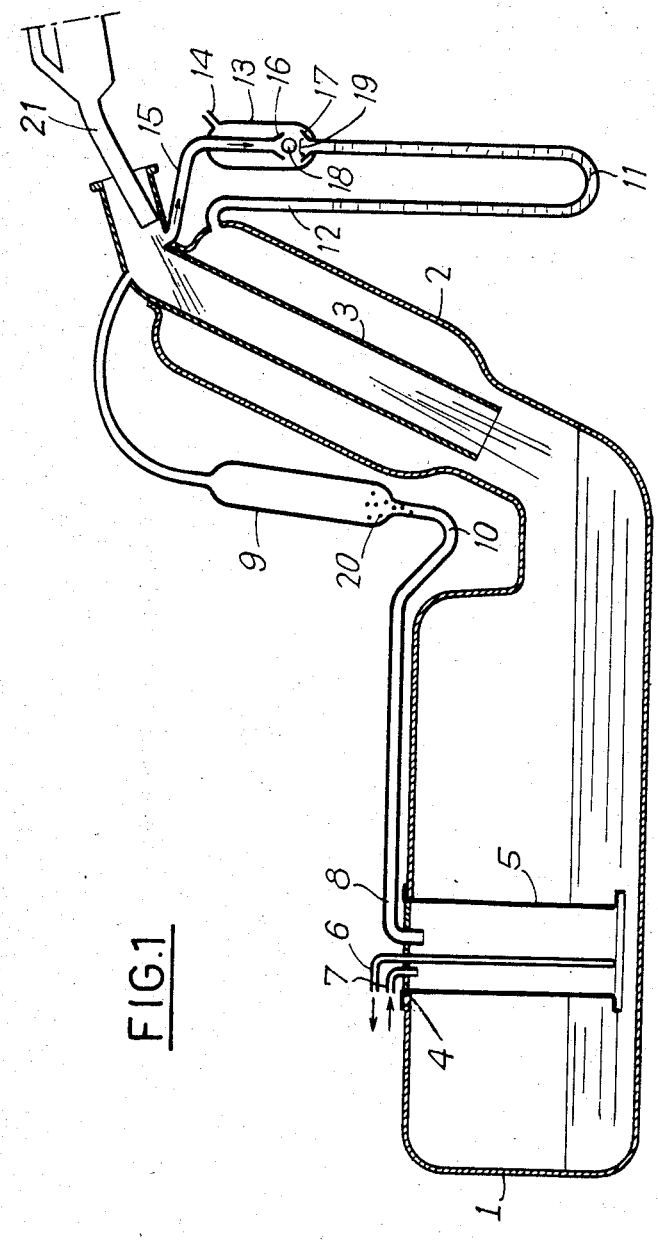
FIG. 1 is a longitudinal section of the tank according to the invention, provided with its various accessory elements, in the initial filling phase.

With reference to FIG. 1, it is seen that the tank according to the invention is made up of a main volume 1, extended upward by an expansion chamber 2, in which is housed filling pipe 3 into which can be inserted a receiving nozzle 21. The upper part of main volume 1 is pierced by a passage 4 into which is introduced a cylindrically shaped module 5 provided with various elements such as a gage (not shown), feed line 6, return line 7 and gas evacuation line 8. This latter extends to the upper part of filling pipe 3. The line 8 has a downwardly bent portion forming a siphon 10 and an enlarged portion forming an expansion chamber 9. A second siphon 11 is formed by a downwardly bent portion of a line 12 which connects to the upper part of expansion chamber 2 and whose other end comes out at the base of a housing 13. The housing 13 has in its upper part a vent 14 provided with a throttle (not shown), and a passage for a line 15 connecting the upper part of pipe 3 to a flare 16 located opposite a corresponding flare 17 extending from line 12. Between the two is placed a check valve system including a spherical float 18 and a support 19.

Functioning of the device according to the invention is as follows:

The first phase of filling the tank is shown in FIG. 1; the fuel, coming from nozzle 21, goes through pipe 3 and fills main volume 1. Simultaneously a flow of liquid enters line 15 and housing 13 and comes out in pipe 12 in which siphon 11 is formed. At this stage of filling the air and fuel vapor from the tank is under excess pressure, which causes a rise of the stagnant liquid in siphon 10 toward expansion chamber 9, accompanied by the formation of bubbles 20 formed by escaping of the excess gas.

Figure 2:
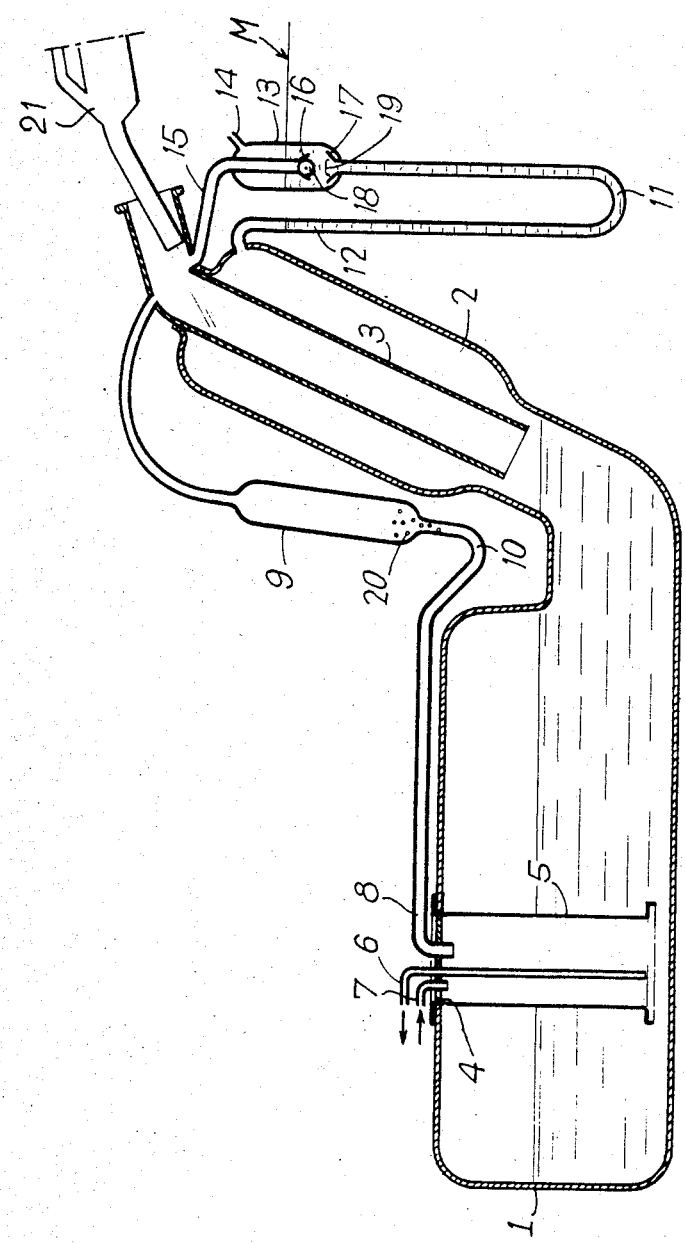
FIGS. 2 to 4 are views of the tank of FIG. 1, during the various filling phases, including the full tank of FIG. 4.

In the second filling phase, shown in FIG. 2, the fuel level continues to rise, isolating expansion chamber 2 from main enclosure 1, from which gas and fuel vapors are evacuated via line 8 and chamber 9. Simultaneously, the liquid entering line 15 fills housing 13 and pipe 12 to level M, upon which float 18 blocks the flare 16 and interrupts the supply of fuel.

Figure 3:
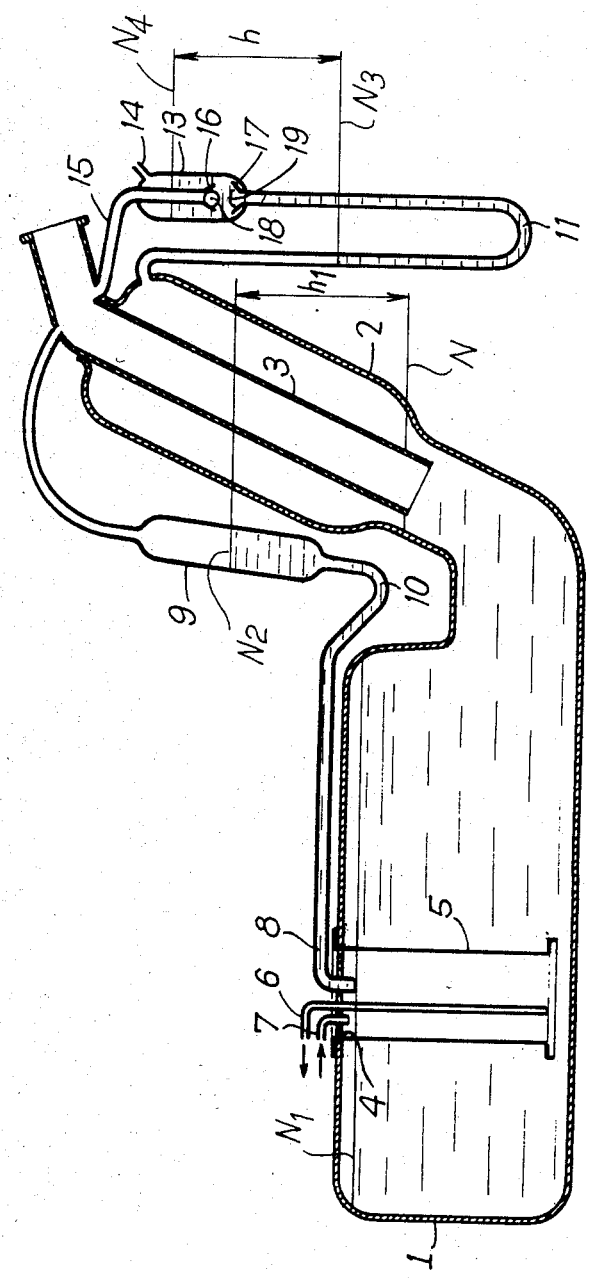

In the third phase, shown in FIG. 3, the fuel reaches its maximum level $N_1$ in main enclosure 1, covering the inlet to gas evacuation pipe 8 and filling expansion chamber 9 to level $N_2$, a level identical with that prevailing in pipe 3. An excess pressure is thus created in expansion chamber 2, proportional to the height of the fuel column $h_1$, which is balanced by a difference h of the levels and $N_3$ and $N_4$ in the hydraulic circuit consisting of line 12, siphon 11 and housing 13.

Figure 4:
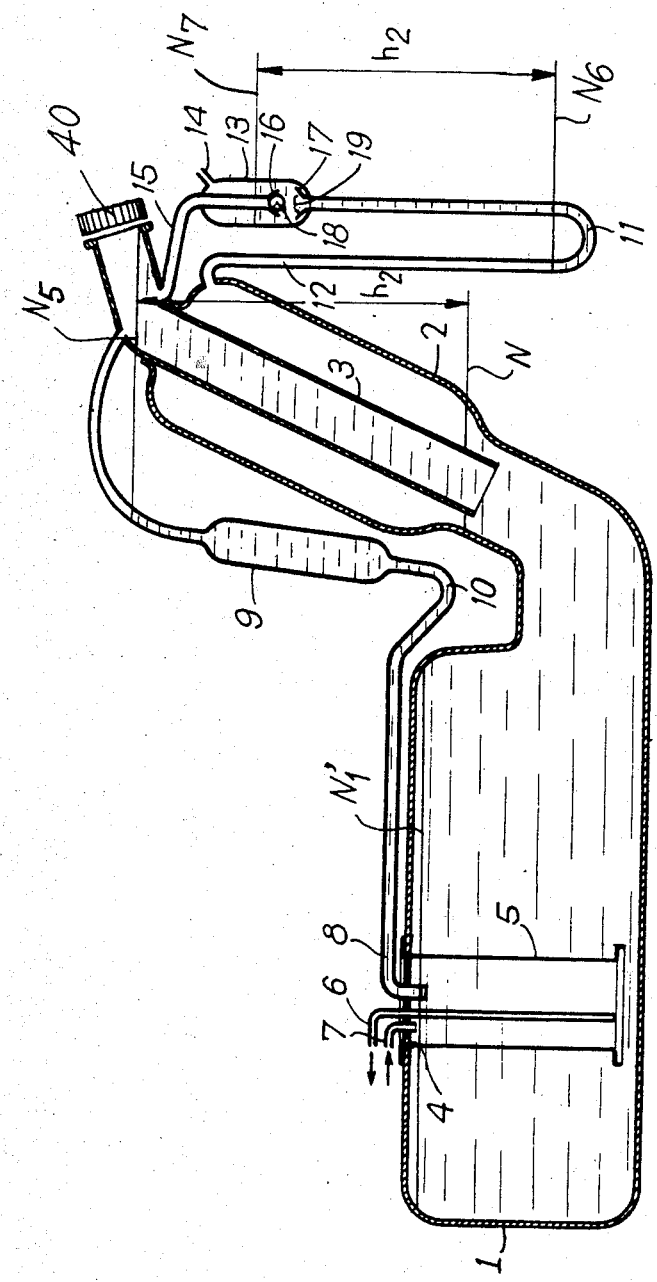

The last filling phase can be seen in FIG. 4 where the fuel level is at $N_5$ in pipe 3 as in gas evacuation line 8. Level N remains stable in expansion chamber 2, with pressure increases being balanced by a modification of the levels $N_6$ and $N_7$ in the hydraulic circuit 11-13, these levels being separated by a fuel column $h_2$. Cap 40 of the tank is then closed.

Figure 5:
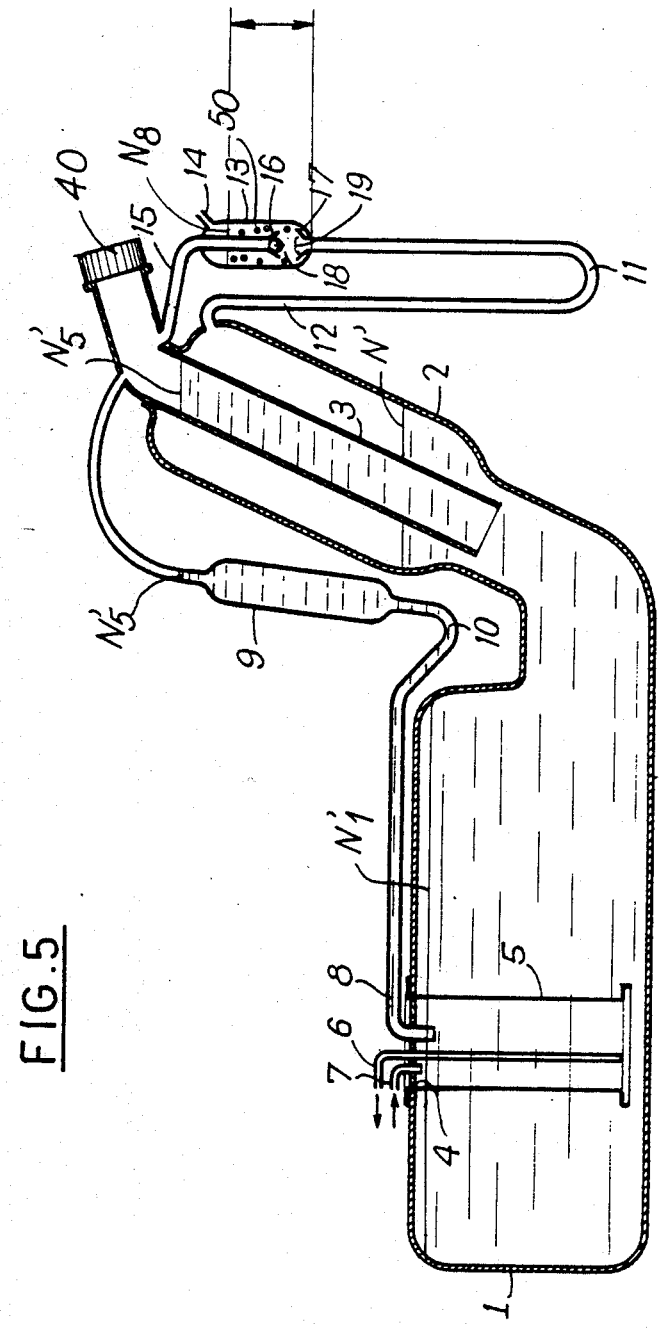
FIG. 5 is a view of the full closed tank, when the temperature of its contents rises.

Assuming that the vehicle is parked in the sun, the temperature and pressure of the air and fuel vapors rises in the top of the pipe 3 and in the upper part of main enclosure 1. This causes a drop in the fuel levels to $N'_5$ (FIG. 5) in pipe 3 and expansion chamber 9, and a rise in expansion chamber 2 of level N to N' as well as of the pressure of the gas that it contains. For this reason the fuel contained in siphon 11 and having height $h_3$ is expelled toward housing 13 up to level $N_8$. The excess gases go through the liquid, in the form of bubbles 50, and are vented at 14, thus lowering the gas pressure in expansion chamber 2.

Figure 6:
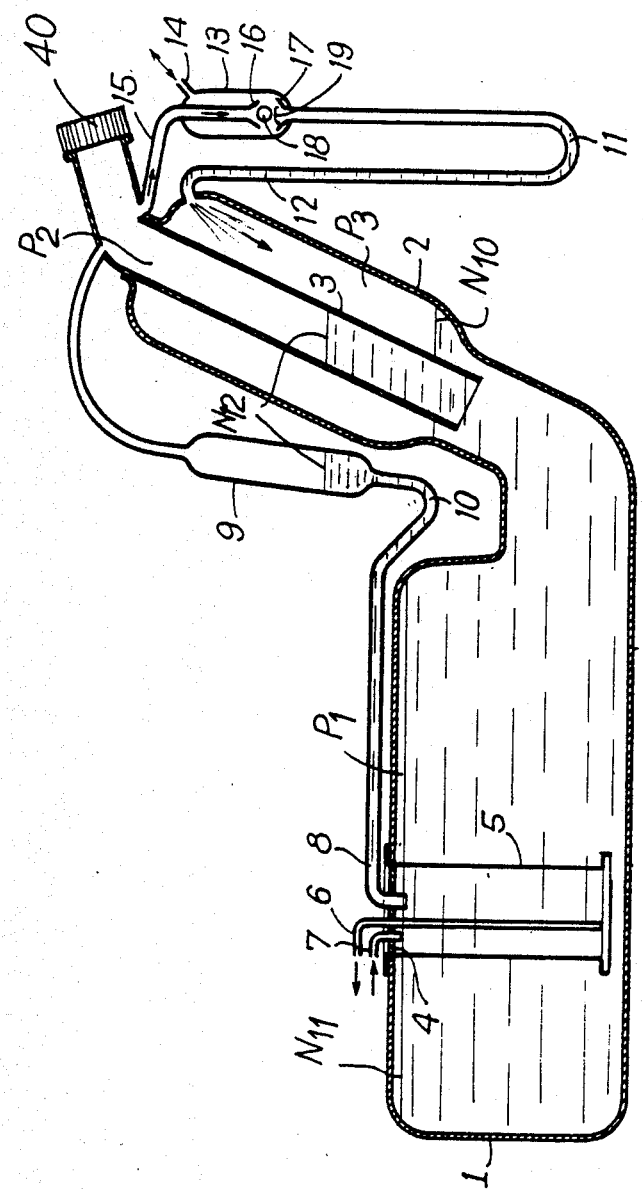
FIG. 6 is a view of the tank after consumption of a significant amount of fuel.

The opposite situation is shown in FIG. 6. A consumption of fuel through line 6 causes a low pressure in the upper part of main enclosure 1 at $P_1$, at $P_2$ in pipe 3 and at $P_3$ in expansion chamber 2 as a result of the lowering of the levels at $N_{10}$, $N_{11}$ and $N_{12}$. It follows from the above that the liquid contained in housing 13, siphon 11 and line 12 empties into chamber 2, allowing venting of the tank by vent 14, which prevents the creation of a vacuum. Check valve 16-19 then comes back into an open position.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A vehicle fuel tank formed of synthetic material and comprising:
    a main enclosure;
    a first expansion chamber communicating with said main enclosure;
    a fuel filler pipe fitted in said first expansion chamber;
    a gas evacuation line connected between an upper portion of said main enclosure and said fuel filler pipe, said gas evacuation pipe having an enlarged portion forming a second expansion chamber and a downwardly bent portion between said main enclosure and said second expansion chamber for forming a first siphon;
    a cylindrical module connected to said upper portion of said main enclosure and extending thereinto, said gas evacuation line communicating with the interior of said module;
    a fuel feed line communicating with the interior of said module;
    a fuel return line communicating with the interior of said module; and
    a conduit connecting an upper part of said fuel filler pipe with an upper part of said first expansion chamber, said conduit including means for preventing the flow of fuel through said conduit in one direction from said first expansion chamber to said fuel filler pipe.

2. The tank of claim 1 wherein said means for preventing comprises:
    a housing;
    a portion of said conduit defining a first line extending from said fuel filler pipe and into said housing;
    another portion of said conduit defining a second line extending from said first expansion chamber into said housing;
    float means in said housing; and
    means for constraining said float means to abut and seal said first line in response to a fuel level in said housing reaching said first line.

3. The tank of claim 2 wherein said float means comprise a spherical float and said means for constraining comprise:
    a first downwardly facing flared end of said first line; and
    a second upwardly facing flared end of said second line below said first flared end,
    said float being positioned between said flared ends.

4. The tank of claim 2 wherein a portion of said second line is downwardly bent to form a second siphon.

5. The tank of claim 3 wherein a portion of said second line is downwardly bent to form a second siphon.

6. The tank of claim 2 including means for venting gas from said housing.

7. The tank of claim 5 including means for venting gas from said housing.

* * * * *